(12) United States Patent
Sneh et al.

(10) Patent No.: US 10,890,282 B2
(45) Date of Patent: Jan. 12, 2021

(54) FACE SEALED FITTINGS

(71) Applicant: Sundew Technologies, LLC, Broomfield, CO (US)

(72) Inventors: Ofer Sneh, Boulder, CO (US); Lee E. Vestman, Littleton, CO (US); Steven F. Ruhnke, Westminster, CO (US)

(73) Assignee: Sundew Technologies, LLC, Broomfield, CO (US)

( * ) Notice: Subject to any disclaimer, the term of this patent is extended or adjusted under 35 U.S.C. 154(b) by 332 days.

(21) Appl. No.: 15/117,210

(22) PCT Filed: Feb. 2, 2015

(86) PCT No.: PCT/US2015/014025
§ 371 (c)(1),
(2) Date: Aug. 8, 2016

(87) PCT Pub. No.: WO2015/130427
PCT Pub. Date: Sep. 3, 2015

(65) Prior Publication Data
US 2016/0356408 A1    Dec. 8, 2016

Related U.S. Application Data

(60) Provisional application No. 61/945,290, filed on Feb. 27, 2014.

(51) Int. Cl.
*F16L 19/02* (2006.01)
*F16L 19/025* (2006.01)

(52) U.S. Cl.
CPC .......... *F16L 19/0212* (2013.01); *F16L 19/025* (2013.01); *F16L 19/0218* (2013.01); *F16L 19/0231* (2013.01)

(58) Field of Classification Search
CPC ... F16L 19/0212; F16L 19/0218; F16L 19/00; F16L 19/025; F16L 19/005; F16L 19/02; F16L 19/0231
USPC ....... 285/328, 336, 354, 353, 355, 391, 331, 285/92, 357, 390, 392, 393, 333, 330, 285/386
See application file for complete search history.

(56) References Cited

U.S. PATENT DOCUMENTS

| | | | |
|---|---|---|---|
| 944,877 A | 12/1909 | Koschinski | |
| 994,877 A | 12/1909 | Koschinski | |
| 1,242,568 A * | 10/1917 | Loughridge | A61M 39/105 285/148.19 |
| 1,378,015 A * | 5/1921 | Erickson | F16L 15/006 285/18 |
| 1,920,512 A * | 8/1933 | Lamont | F16L 19/04 285/179 |

(Continued)

FOREIGN PATENT DOCUMENTS

GB    539900    9/1941

*Primary Examiner* — Matthew Troutman
*Assistant Examiner* — William S. Choi (57) ABSTRACT

Face-sealed fittings are described for joining flanged tubes. These fittings utilize unique designs for pairing rings, nipples, and nuts to provide several advantages over prior art designs. Face-sealed fittings provided herein are symmetrical and genderless, and are field attachable/removable over previously welded glands. Moreover, they are torque free and have footprints comparable or smaller than legacy assemblies.

11 Claims, 9 Drawing Sheets

(56) References Cited

U.S. PATENT DOCUMENTS

| | | | | |
|---|---|---|---|---|
| 2,323,099 A * | 6/1943 | Patten | ................... | F16L 19/00 285/14 |
| 3,047,301 A | 7/1962 | Taylor et al. | | |
| 3,130,988 A * | 4/1964 | Ryan | ................... | F16L 31/00 285/148.13 |
| 3,521,910 A * | 7/1970 | Callahan, Jr. | ....... | F16L 19/0218 285/353 |
| 4,303,251 A * | 12/1981 | Harra | ................... | F16J 15/0881 277/614 |
| 4,572,551 A * | 2/1986 | Jaquette | ............. | F16L 19/0212 285/108 |
| 4,589,688 A * | 5/1986 | Johnson | ................ | E03C 1/0403 285/12 |
| 4,801,158 A * | 1/1989 | Gomi | ................. | F16L 25/0036 285/330 |
| 4,838,583 A * | 6/1989 | Babuder | ............. | F16L 19/0212 277/609 |
| 4,848,804 A * | 7/1989 | Weigl | ................... | F16L 25/023 285/52 |
| 4,854,613 A * | 8/1989 | Reece | ................... | F16B 39/10 285/39 |
| 4,886,304 A * | 12/1989 | Kunsman | ............. | F16L 19/065 285/104 |
| 5,040,714 A * | 8/1991 | McManigal | ........ | F16L 19/0212 277/608 |
| 5,066,051 A * | 11/1991 | Weigl | ................. | F16L 19/0212 285/328 |
| 5,145,219 A * | 9/1992 | Babuder | ............. | F16L 19/0212 277/609 |
| 5,163,721 A * | 11/1992 | Babuder | ............. | F16L 19/0212 277/609 |
| 5,261,710 A * | 11/1993 | Jyh-Snyong | ............ | F16L 19/06 285/323 |
| 5,299,843 A | 4/1994 | Weigl et al. | | |
| 5,350,205 A * | 9/1994 | Aldridge | ................ | F16L 19/02 285/321 |
| 5,366,261 A * | 11/1994 | Ohmi | ................... | F16L 19/0212 277/609 |
| 5,375,887 A | 12/1994 | Johnson | | |
| 5,388,871 A * | 2/1995 | Saitoh | ................ | F16L 19/0218 285/247 |
| 5,401,065 A | 3/1995 | Okumura et al. | | |
| 5,515,159 A * | 5/1996 | Sites | .................. | G01N 21/9515 348/131 |
| 5,516,155 A * | 5/1996 | Ko | ...................... | F16L 19/0212 285/12 |
| 6,193,239 B1 * | 2/2001 | Fukano | ................ | F16L 19/028 277/615 |
| 6,308,994 B1 * | 10/2001 | Eidsmore | ............... | F16L 19/02 285/279 |
| 6,623,047 B2 * | 9/2003 | Olechnowicz | ........ | F16L 19/005 277/611 |
| 6,685,237 B1 * | 2/2004 | Robinson | ........... | F16L 19/0212 285/330 |
| 7,364,166 B2 * | 4/2008 | Yoakam | ............ | F16L 19/0218 277/608 |
| 7,726,701 B2 * | 6/2010 | Koji | ..................... | F16L 19/0286 285/14 |
| 7,793,994 B2 * | 9/2010 | Boyd | ..................... | E21B 17/04 285/330 |
| 2002/0125716 A1 * | 9/2002 | Rochelle | ........... | F16L 19/0231 285/32 |
| 2005/0140141 A1 * | 6/2005 | Velez | ................... | F16L 19/065 285/354 |
| 2009/0230678 A1 * | 9/2009 | Krohn | .................. | F16L 19/061 285/354 |
| 2013/0147189 A1 * | 6/2013 | Horsfall | ............... | F16L 19/046 285/353 |
| 2015/0330542 A1 * | 11/2015 | Lin | ...................... | F16L 19/025 285/354 |

* cited by examiner

FACE SEALED FITTINGS

FIELD OF THE INVENTION

This invention relates to the field of metal tube couplings and, more specifically, to improved assemblies for face sealed fittings.

BACKGROUND OF THE INVENTION

Metallic tubes are commonly used for the transfer of fluids such as gasses or liquids. In particular, highly pure fluids, as well as toxic, corrosive, flammable or pyrophoric fluids are preferably handled within all-metallic delivery tubing and manifolds. The efficient construction of manifolds that include delivery tubing, valves, filters, control instruments and many other components invokes all-metallic couplings wherein sections of tubes, as well as other components are connected into spill-free manifolds. These couplings are known in the art as fittings.

Face sealed fittings typically comprise opposed tube ends (frequently called "glands") that define highly polished circular protuberances ("beads"). A coupling is created when a softened metallic gasket is compressed and deformed between two tube ends by means of two threaded nuts. Ideally, the contact between the glands and the deformed gasket corresponds to a spill and leak tight coupling. One such fitting is described in U.S. Pat. No. 3,521,910 to Callahan, et al. and entitled "Tube Coupling." Another such fitting is described in U.S. Pat. No. 6,161,875 to Yamaji, et al. and entitled "Fluid Coupling."

Figures 1A, 1B:
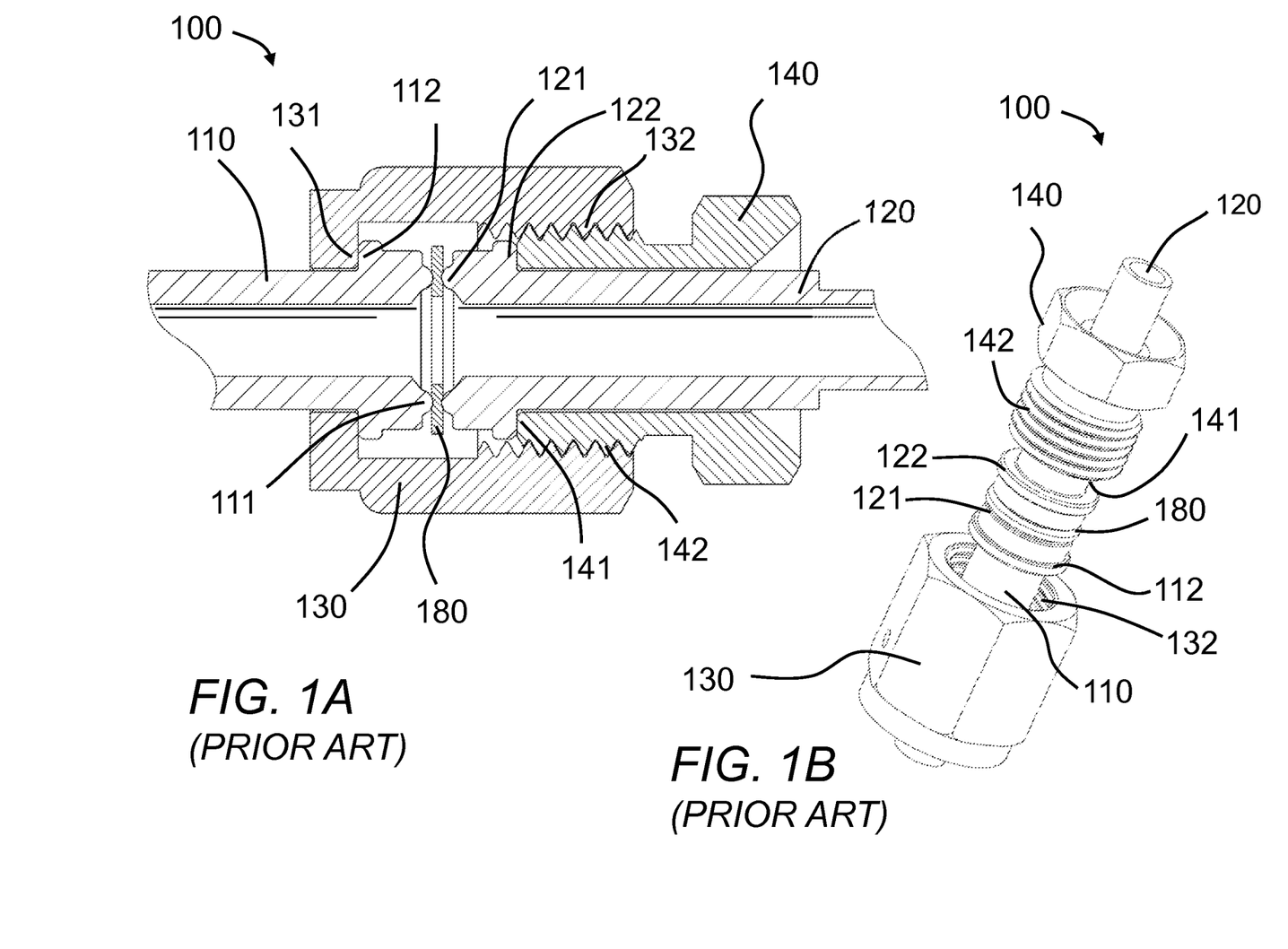
FIG. 1A shows a sectional view of a prior art fitting assembly.
FIG. 1B shows a perspective view of the FIG. 1A fitting assembly.

A fitting assembly 100 in accordance with U.S. Pat. No. 3,521,910 is depicted in FIGS. 1A and 1B, where FIG. 1A shows a sectional view, and FIG. 1B shows a perspective view. The fitting assembly 100 includes glands 110, 120, which terminate in opposed flanges 112, 122. Flanges 112, 122 are drawn together when female nut 130 (with internal threads 132) screwably engages male nut 140 (with external threads 142). Doing so has the effect of axially tightening beads 111, 121 into gasket 180 to form a seal. Unfortunately, at the same time, screwably engaging nuts 130, 140 also tends to generate relative rotation between circular beads 111, 121, promoted by friction between female nut shoulder 131 and flange 112, as well as friction between male nut tip 141 and flange 122. This unwanted relative rotation can have serious consequences. The relative rotation may, for example, damage sealing surfaces, promote galling and build up a torque inside the assembly, resulting in compromised seal performance, wear and particle generation. Even worse, built-up torque has the tendency to unwind and undo the assembly, particularly when vibrations are present, leading to potentially catastrophic leaks and spills. Such torque buildup may therefore result in costly product and yield losses from leaks and particles, accelerated wear that requires costly and extensive maintenance and repair, and costly downtime, as well as numerous hazardous situations, accidents, spills and related costly cleanups and shutdowns.

In spite of the torque buildup problem and its implications, fitting assemblies like fitting assembly 100 have become standard metal-to-metal seals in many different applications and industries. These fittings are entrenched into factories around the world and have become globally available from many manufacturers, with full compatibility between products from different suppliers. Becoming a standard in multiple industries has enabled advantageous mixing and matching of many different components from different manufacturers (i.e., modularity) with unprecedented design flexibility.

While fitting assemblies like fitting assembly 100 are in widespread usage, their less than ideal characteristics have spawned alternative designs that attempt to deal with torque buildup. New designs capable of working with at least some legacy parts are particularly desirable because these parts are so ubiquitous. One such alternative design is described in U.S. Pat. No. 5,887,876 to Aldridge, et al. and entitled "High Purity Gas Fitting with Grooved Gasket." In this design, a modified thicker gasket includes circular grooves that increase the contact area and the friction between the circular beads and the gasket. Accordingly, higher friction at the seal is able to better balance off friction between the nuts and the flanges to suppress rotation and torque buildup. These modified gaskets are commercially available from Parker Hannifin Corporation (Mayfield Heights, Ohio, USA) with the trade name TorqTite. Unfortunately, this improvement does not consistently eliminate torque buildup problems. Moreover, the grooved gaskets tend to increase the potential entrapment of fluid at the seal, which is disadvantageous in many sensitive applications.

Other designs have invoked the addition of thrust bearings to mitigate friction between the nuts and the flanges. While not suitable for straightforward upgrade of existing installations, some of these remedies are fully compatible and can fully mate with legacy fittings. For example U.S. Pat. No. 6,382,683 to Albright et al. and entitled "High Pressure Gas Fitting with Non-Rotatable Features" teaches a sliding ring within the construction of the female nut to mitigate transfer of torque from that nut to the remainder of the fitting. These fittings are commercially available from Parker Hannifin Corporation (Mayfield Heights, Ohio, USA) with the trade name Non-Rotational Female Nut. Similarly, legacy fittings that include torque mitigating ball bearings within extended-length female nuts are commercially available from Fujikin Incorporated (Santa Clara, Calif., USA) with the trade name PureRing. However thrust bearings at just the female nut do not mitigate the friction at the male nut, and, accordingly, do not consistently eliminate torque buildup problems. While this situation may be improved by also utilizing additional low profile thrust bearings between the male nut and the flange, the inventors of the present application have empirically found that such remedies still do not fully and consistently eliminate torque buildup issues. Likewise, the present inventors have further determined that other remedies that implement thrust bearings over modified glands such as the invention disclosed in U.S. Pat. No. 6,308,994 to Eidsmore and entitled "Fluid Fitting with Torque Suppression Arrangement" do not perform well enough to justify their additional cost and complexity.

An entirely different approach is described in U.S. Pat. No. 5,066,051 to Weigl et al. and entitled "Anti-Twist Coupling Assembly with Biasing Means," wherein a thrust bearing between the female nut and respective flange is restricted from rotation against the male nut by means of axially engaged portions. However, this improvement still lacks a thrust bearing or any other means to prevent the male nut from applying torque to its respective gland. That deficiency may be resolved in the remedy disclosed in U.S. Pat. No. 5,829,796 to Robinson and entitled "Protection of Sealing Surfaces of Metal Face Seals in Tubing Fittings," wherein thrust bearings on both nuts are axially engaged to effectively prevent any transfer of rotation from the nuts to the glands. This apparatus does seem to eliminate the torque buildup problem. The fittings are commercially available with the trade name "Torque Suppressed Fittings" and sold by the Omnisafe Company (Sunnyvale, Calif., USA).

Nevertheless, while having positive effects, torque suppressing improvements such as the ones described in the two just-referenced patents are not fully compatible and/or able to mate with legacy fittings. In particular, redesigned nuts that enable thrust bearing engagements cannot mate with legacy nuts. Legacy fittings are typically permanently attached to components and fluid delivery lines. For example in fitting assembly 100 of FIGS. 1A and 1B, female nut shoulder 131 of female nut 130 has a minimum internal diameter that is smaller than the maximum external diameter of flange 112. As a result, once gland 110 is welded to a fluid delivery line or a component, flange 112 prevents the removal of female nut 130. Likewise, male nut 140 has a minimum internal diameter that is smaller than the maximum external diameter of flange 122. Here again, once gland 120 is welded to a fluid delivery line or a component, flange 122 prevents the removal of male nut 140.

This permanent attachment prohibits a cost effective transition to the implementation of torque-free fittings in both existing and new plants. It also more than doubles the cost and logistic-related burdens of component inventories with many different varieties of female and male nuts. Hence, upgrading legacy fittings to use torque-suppressing nuts and axially engaged thrust bearings requires a substantial rework, including gland cutoff and reattachment by welding. Not surprisingly, such prohibitively expensive and disruptive upgrades have been avoided in almost 100% of worldwide plants. At the same time, the maintenance and repair of multimillions of fluid delivery lines and components within these plants keep the market for legacy-fitting-compatible components and gas lines in par with the market for new parts. Supporting both existing plants with their legacy fittings, and a transition of new plants and new equipment that use (incompatible) torque-suppressing fittings is prohibitively expensive and logistically difficult for most manufacturers and end-users since inventories would have to include both legacy and torque-suppressing parts. Alternatively, keeping parts without glands and fittings for a last minute weld-on per demand can stretch lead times and can severely impact the trend of "lean-manufacturing." With such adverse economic impact, torque eliminating fittings have not gained widespread acceptance and are marginalized into a small portion of the worldwide market.

Legacy fittings that are not permanently attached to components or fluid delivery lines with the trade name "Split Nut Assemblies" (SN Assemblies) are commercially available and sold by the Swagelok Company (Sohon, Ohio, USA). These fittings are disclosed in U.S. Pat. Nos. 5,547, 229 and 5,636,876 to Eidsmore and entitled "Fluid Coupling Assembly." In these designs, the male nut is split into two halves that are held together when fastened into a female nut. The male nut can be easily removed from gland 120 once the fitting is undone by splitting the nut into halves. The female nut comprises three components wherein the functionality of female nut shoulder 131 is provided by a split male nut with a left hand thread. This split male nut is threaded into a bushing adapter to create a female nut. The female bushing adapter comprises a left hand thread on one side and a right hand thread on the other side. The left hand thread matches the one on the left-hand threaded male split nut. The right hand thread matches the thread of a legacy male nut. The female nut is assembled over gland 110 by combining the left hand split nut behind flanges 112 and threading the split nut into the left hand thread part of the bushing. It is removed by the reverse operation. These split nuts are fully compatible with legacy fittings. Their higher cost is offset by reduced inventory costs and reusability. They also enable shorter components because the welding of shorter glands is possible in the absence of nuts (since nuts do not have to be assembled over glands 110, 120 during welding).

In principle, SN fittings may pave a path for upgradeable torque-free fittings. For example, if the axially-engaged thrust bearings can be made in a split form ("Split Torque Eliminators"), such "field-attachable" fittings, if they existed, could break free from the impediment of incompatibility with legacy fittings. With such field-attachable fittings, new components and fluid delivery lines would ideally not include permanently attached fittings. Then torque eliminating field-attachable fittings could be used for new plants and equipment. Such components and fluid delivery lines without permanently attached fittings could also be suitable for use in maintenance, repair and upgrade of legacy plants and equipment by applying legacy (field-attachable) SN fittings. Moreover, in many cases, components and fluid delivery lines could be installed in legacy manifolds with torque-free field-attachable fittings. For example, in these cases, the permanently attached nuts could simply be pushed back, away from flanges 112, 122 to free up the glands 110, 120 for the field-attachable fittings.

The additional cost of field-attachable torque-free fittings might be offset by the cost savings from improved reliability, avoiding downtime and catastrophic failure from torque-buildup-driven release, eliminated fittings wear, reduced inventories of components and fluid delivery lines (eliminating the need to keep separate inventories for female and male varieties), avoiding yield reduction from particles generated from gland/gasket galling, and fitting reusability. That said, inevitably higher cost could still limit these torque-free split fittings into a small portion of the worldwide market. In addition, the need to create room for the Split Torque Eliminators will inevitably cause the size of the nuts to grow. Moreover, Split Torque Eliminators could require even larger space and even larger nuts. These "footprint" issues may reduce the appeal of torque-free SN fittings and further reduce their market share. Unfortunately, market share restrictions would eliminate the cost benefits of reduced inventories and its related cost appeal. In the end, prospects of a limited market may reduce the drive to develop and commercialize such currently non-existing products.

Thus, there is a need for cost competitive, field-attachable, torque-free fittings that are capable of mating with legacy face sealed parts. Such fittings should be restricted to a footprint similar or smaller than the footprint of legacy face sealed fittings. There is also a need for assemblies for gender-free fastening of face sealed fittings.

SUMMARY OF THE INVENTION

Embodiments in accordance with aspects of the invention provide apparatus and methods that address the above-identified needs.

Aspects of the invention are directed to a kit for use with a tube terminating in a flange, where the flange defines an outwardly projecting flange shoulder and is characterized by a maximum external flange diameter. The kit comprises a pairing ring, a nipple, and a nut. The pairing ring defines a pairing ring engagement feature. The nipple defines a nipple engagement feature and external nipple threads, and is characterized by a minimum internal nipple diameter greater than the maximum external flange diameter. Lastly, the nut defines internal nut threads and an inwardly projecting nut shoulder, and is characterized by a minimum internal nut diameter greater than the maximum external flange diameter. The kit is adapted to be configured such that, simultaneously: (i) the pairing ring surrounds a portion of the tube adjacent to the flange; (ii) the pairing ring abuts the outwardly projecting flange shoulder; (iii) the pairing ring abuts the inwardly projecting nut shoulder; (iv) the nipple at least partially surrounds the outwardly projecting flange shoulder; (v) the nipple at least partially surrounds the pairing ring; (vi) the nut at least partially surrounds the pairing ring; (vii) at least a portion of the internal nut threads engage at least a portion of the external nipple threads; and (viii) the nipple engagement feature engages the pairing ring engagement feature so as to inhibit relative rotation between the nipple and the pairing ring.

Additional aspects of the invention are directed to an assembly comprising a first tube, a first flange, a first pairing ring, a nipple, and a nut. The first flange is disposed at a terminus of the first tube, defines a first outwardly projecting flange shoulder, and is characterized by a first maximum external flange diameter. The first pairing ring defines a first pairing ring engagement feature. The nipple defines a first nipple engagement feature and first external nipple threads, and is characterized by a first minimum internal nipple diameter greater than the first maximum external flange diameter. The first nut defines first internal nut threads and a first inwardly projecting nut shoulder, and is characterized by a first minimum internal nut diameter greater than the first maximum external flange diameter. When assembled: (i) the first pairing ring surrounds a portion of the first tube adjacent to the first flange; (ii) the first pairing ring abuts the first outwardly projecting flange shoulder; (iii) the first pairing ring abuts the first inwardly projecting nut shoulder; (iv) the nipple at least partially surrounds the first outwardly projecting flange shoulder; (v) the nipple at least partially surrounds the first pairing ring; (vi) the first nut at least partially surrounds the first pairing ring; (vii) at least a portion of the first internal nut threads engage at least a portion of the first external nipple threads; and (viii) the first nipple engagement feature engages the first pairing ring engagement feature so as to inhibit relative rotation between the nipple and the first pairing ring.

Even additional aspects of the invention are directed to a method for mating tubing. A first tube, a first flange, a first pairing ring, a nipple, and a first nut are initially received. The first flange is disposed at a terminus of the first tube, defines a first outwardly projecting flange shoulder, and is characterized by a first maximum external flange diameter. The first pairing ring defines a first pairing ring engagement feature. The nipple defines a first nipple engagement feature and first external nipple threads, and is characterized by a first minimum internal nipple diameter greater than the first maximum external flange diameter. The first nut defines first internal nut threads and a first inwardly projecting nut shoulder, and is characterized by a first minimum internal nut diameter greater than the first maximum external flange diameter. The elements are assembled such that: (i) the first pairing ring surrounds a portion of the first tube adjacent to the flange; (ii) the first pairing ring abuts the first outwardly projecting flange shoulder; (iii) the first pairing ring abuts the first inwardly projecting nut shoulder; (iv) the nipple at least partially surrounds the first outwardly projecting flange shoulder; (v) the nipple at least partially surrounds the first pairing ring; (vi) the first nut at least partially surrounds the first pairing ring; (vii) at least a portion of the first internal nut threads engage at least a portion of the first external nipple threads; and (viii) the first nipple engagement feature engages the first pairing ring engagement feature so as to inhibit relative rotation between the nipple and the first pairing ring.

Notably, in one or more embodiments of the invention, each of the above-identified pairing rings may comprise a respective first pairing ring portion and a respective second pairing ring portion, where the second pairing ring portion is manually separable from the first pairing ring portion.

The above-identified embodiments provide several advantages. More particularly, embodiments in accordance with aspects of the invention may, as just a few examples, provide one or more of:
1. fittings that are symmetrical/genderless;
2. fittings that are field-attachable/removable over previously welded glands;
3. fittings that are torque free; and
4. fittings that have footprints comparable or smaller than legacy assemblies.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Many of the elements described herein are associated with tubing. As used herein, the "axial" direction is defined as a direction that parallels the central longitudinal axis of the associated tubing. At the same time, an element is "outwardly projecting" if it projects away from the associated tubing. Finally, an element is "inwardly projecting" if that element projects towards the associated tubing.

Figure 2A:
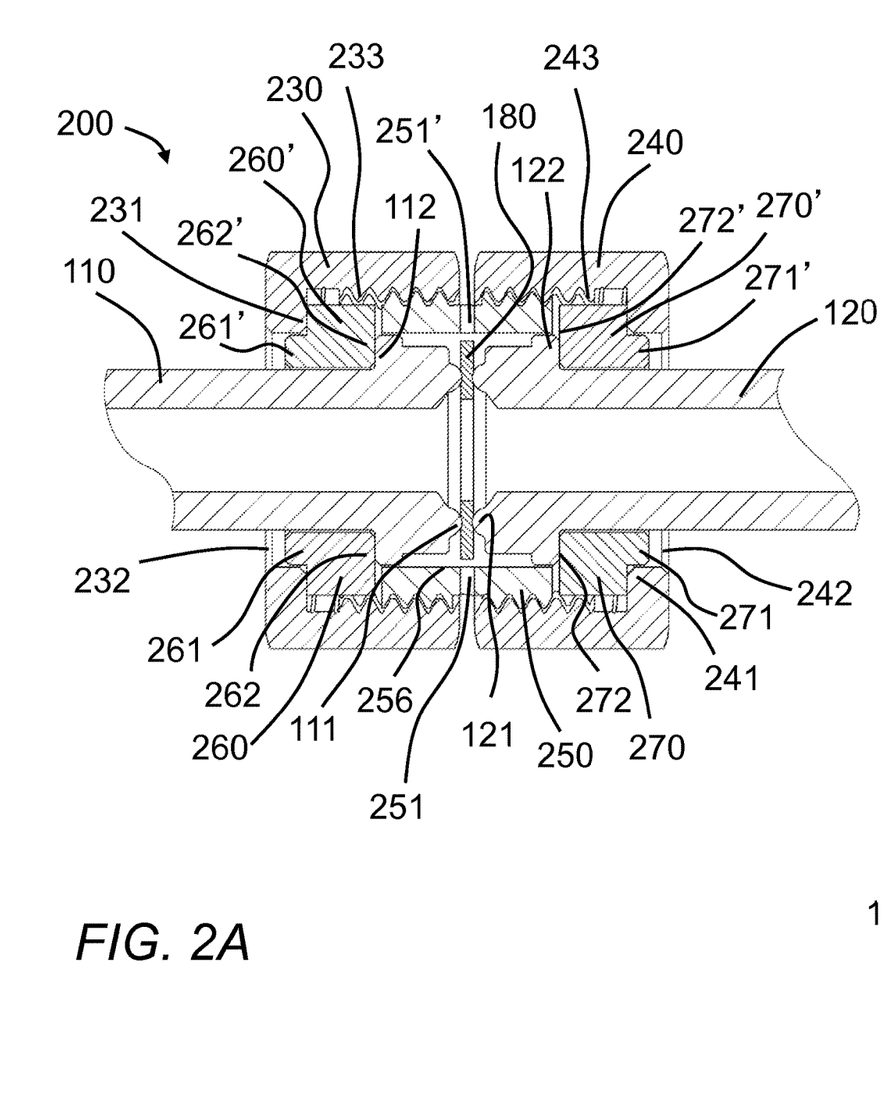
FIG. 2A shows a sectional view of a fitting assembly in accordance with a first illustrative embodiment of the invention.
Figure 2B:
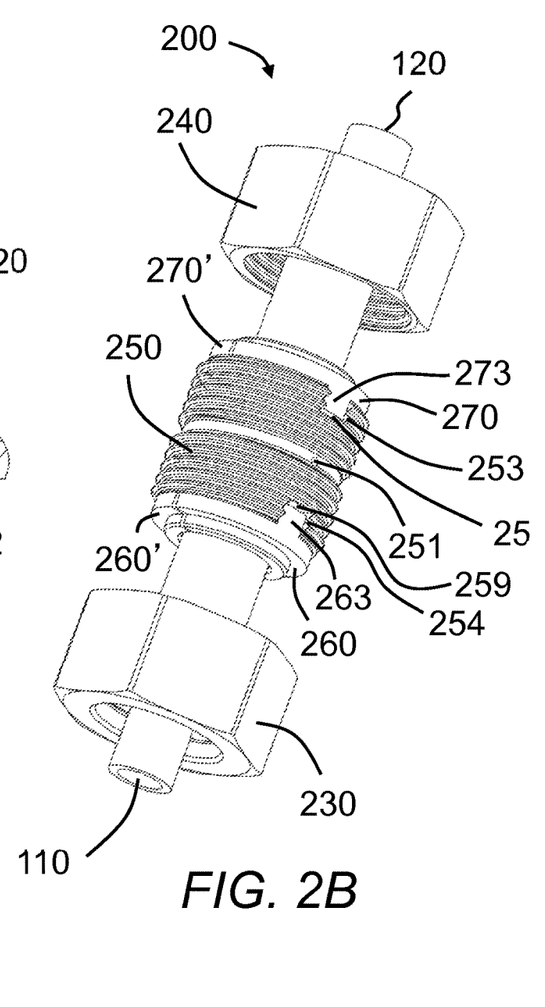
FIG. 2B shows a perspective view of the FIG. 2A fitting assembly.
Figure 2C:
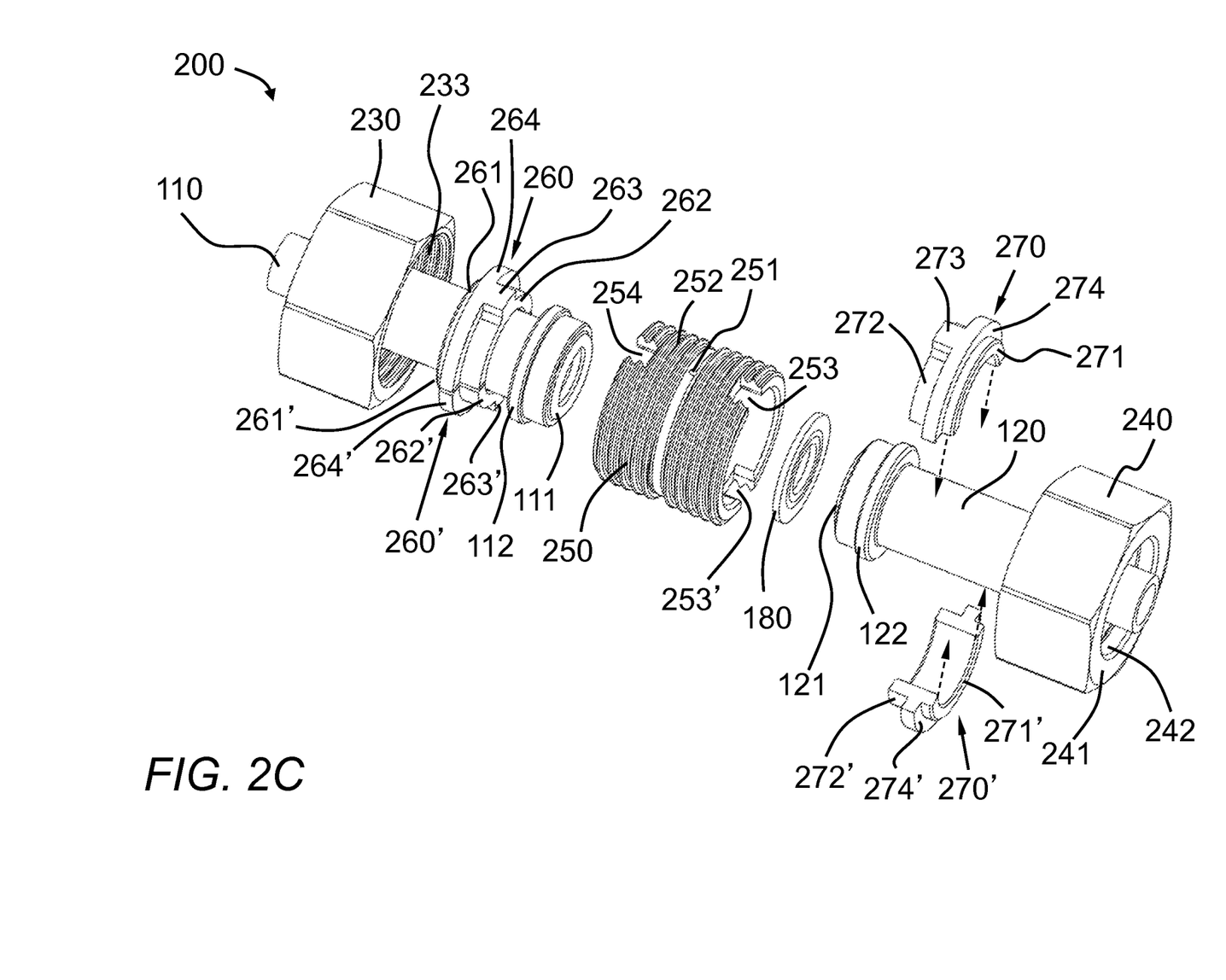
FIG. 2C shows an exploded perspective view of the FIG. 2A fitting assembly.

Aspects of fitting assembly 200 in accordance with a first illustrative embodiment of the invention are depicted in FIGS. 2A-2C, where FIG. 2A shows a sectional view; FIG. 2B shows a perspective view; and FIG. 2C shows an exploded perspective view. In the fitting assembly 200, a seal is created between glands 110, 120 and gasket 180, all of legacy design. Coupling nuts 230, 240, having internal threads 233, 243, are assembled over glands 110, 120 by sliding over flanges 112, 122, respectively. The openings 232, 242 of nuts 230, 240 at shoulders 231, 241, respectively, are larger than flanges 112, 122. Therefore, the nuts 230, 240 can be assembled over previously welded glands 110, 120. Pairing ring counterparts 260, 260' are placed over gland 110. Likewise, pairing ring counterparts 270, 270' are placed over gland 120. Pairing ring counterpart 260 includes ribs 261, 262, tooth 263 and flange 264. Similarly, pairing ring counterpart 260' includes ribs 261', 262', tooth 263' and flange 264'. Pairing ring counterparts 270, 270' further comprise ribs 271, 271', 272, 272', teeth (i.e., projections) 273, 273' and flanges 274, 274'. Nut 230 fits over assembled pairing ring 260+260', causing combined ribs 261+261' to be contained inside opening 232. Similarly, assembled pairing ring 270+270' is surrounded by nut 240 after being placed over gland 120.

Nipple 250 is initially assembled over one of the glands 110, 120. Nipple 250 includes leak testing holes 251, 251' and male threads 252. Nipple 250 further defines two pairs of notches (i.e., slots): notches 253, 253' overlying gland 120, and notches 254, 254' overlying gland 110 (where notch 254' is opposite notch 254 but is not visible). Bore (i.e., internal opening) 256 of nipple 250 is larger than the diameter of glands 110, 120. Teeth 263, 263' of assembled pairing ring 260+260' fit and axially engage notches 254, 254'. Likewise, teeth 273, 273' of assembled pairing ring 270+270' fit and axially engage notches 253, 253'. Fastening is accomplished when nuts 230, 240 are tightened over nipple 250. As a result of this tightening, nut 230 applies force against flange 264+264', which is axially transferred to flange 112. Likewise, nut 240 applies force against flange 274+274', which is axially transferred to flange 122. Axial engagement of pairing ring 260+260' via teeth 263, 263' and notches 254, 254', and axial engagement of pairing rings 270+270' via teeth 273, 273' and notches 253, 253', prevent the transfer of any rotation from nuts 230, 240 to glands 110, 120. Accordingly, torque free fastening is readily accomplished.

In forming fitting assembly 200, the axial depth of notches 253, 253', 254, 254' preferably exceed the axial length of respective teeth 273, 273', 263, 263' so as to create gaps 258, 258', 259, 259', respectively (where gaps 258', 259' are opposite gaps 258, 259 but are not visible). These gaps 258, 258', 259, 259' are preferably designed to limit the axial tightening of fitting assembly 200 and prevent possible bead damage from over-tightening and/or tightening with a missing gasket 180.

Fitting assembly 200 may provide several cost benefits to the user. Fitting assembly 200 is, for example, preferably implemented with identical nuts 230, 240, identical pairing ring counterparts 260, 260', 270, 270', and nipple 250. As a result, a total of seven parts of three different varieties are needed. This part count compares favorably with two different parts per standard legacy fitting, five parts of five different varieties per legacy split fitting, or four parts of three different varieties per Torque Suppressed Fitting.

Additional cost benefits may also include reduced inventories of components and fluid delivery lines by eliminating the redundancy of permanently attached male and female nuts, as well as cost benefits associated with avoiding fitting wear, leaks and spills, and yield loss from particles. As discussed above, these cost benefits have a straightforward path into existing applications. There are also additional cost benefits from reusing field-attachable/removable fittings in accordance with aspects of the invention when components and fluid delivery lines are replaced as part of maintenance and repair. Finally, those who are skilled in the art will appreciate that, in spite of their seemingly more complicated assembly, fittings falling within the scope of the invention actually simplify and reduce the effort and duration of fastening face sealed fittings by eliminating an assortment of awkward attempts to minimize torque buildup in legacy fittings.

Once understood from the teachings provided herein, the various elements of fitting assembly 200 may be formed from conventional materials utilizing well-understood manufacturing techniques. Fitting assembly 200 may, for example, be implemented in stainless steel. For example, pairing ring counterparts 260, 260', 270, 270' may be implemented in heat treated 17-4 PH stainless steel, coupling nuts 230, 240 may be implemented in tempered 416 stainless steel, and nipple 250 may be implemented in 416 or 304L stainless steel. That said, these specific materials are merely illustrative and other equally suitable materials will also fall within the scope of the invention. In any case, as part of manufacture, the three different parts of fitting assembly 200 are preferably implemented in different corrosion resistant alloys and/or temper varieties to suppress galling and wear. Coupling nuts 230, 240 and nipple 250 may be suitable for low cost, Swiss screw-machine manufacturing. Similarly, pairing ring counterparts 260, 260', 270, 270' may be formed by Metal Injection Molding (MIM) manufacturing. Both manufacturing techniques and equally suitable alternatives will be familiar to one having ordinary skill in the art. Reference is also made to H. Youssef et al., *Machining Technology: Machine Tools and Operations*, CRC Press, 2008; and D. Heaney, *Handbook of Metal Injection Molding*, Elsevier, 2012, which are both hereby incorporated by reference herein.

Figures 3A, 3B:
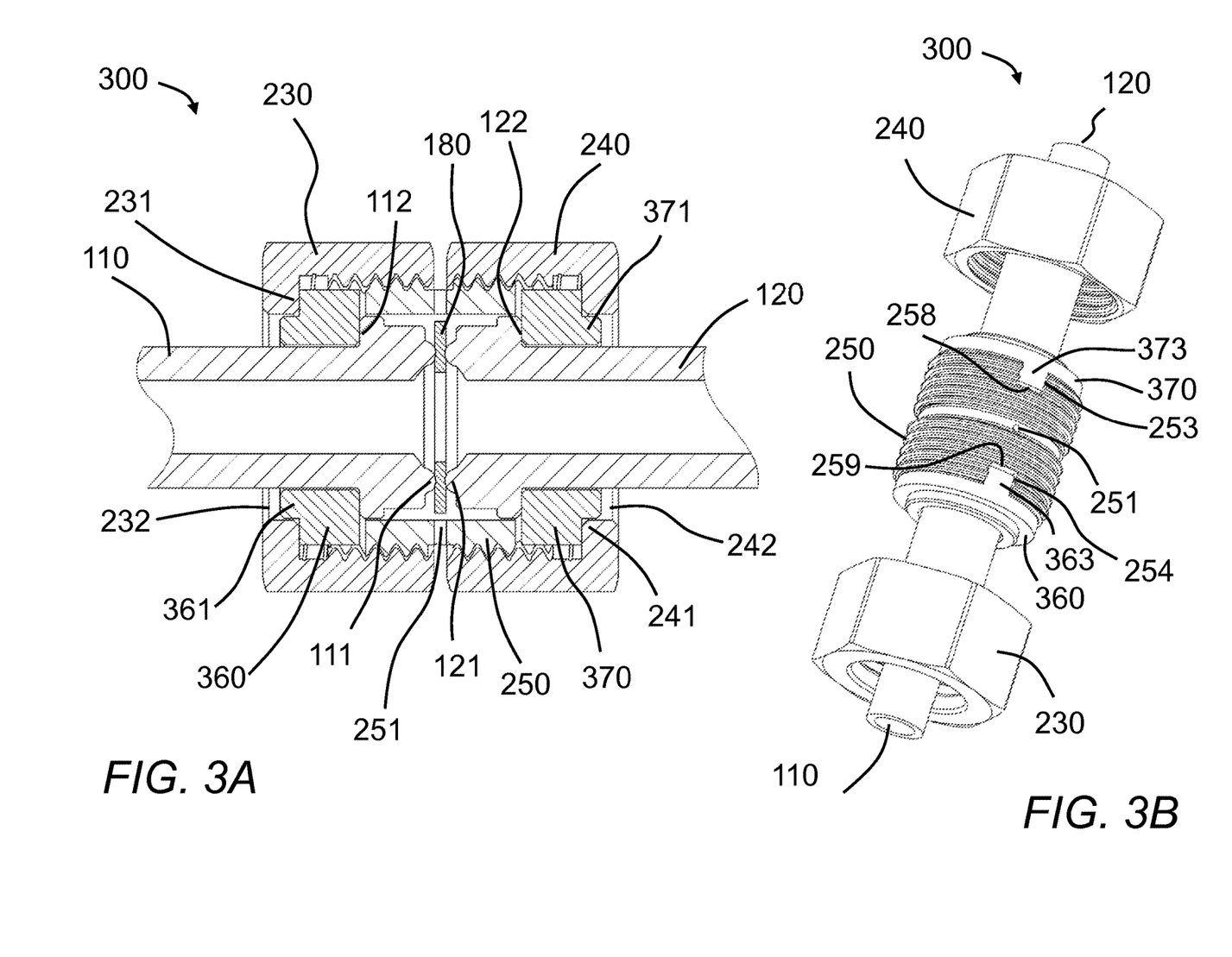
FIG. 3A shows a sectional view of a fitting assembly in accordance with a second illustrative embodiment of the invention.
FIG. 3B shows a perspective view of the FIG. 3A fitting assembly.
Figure 3C:
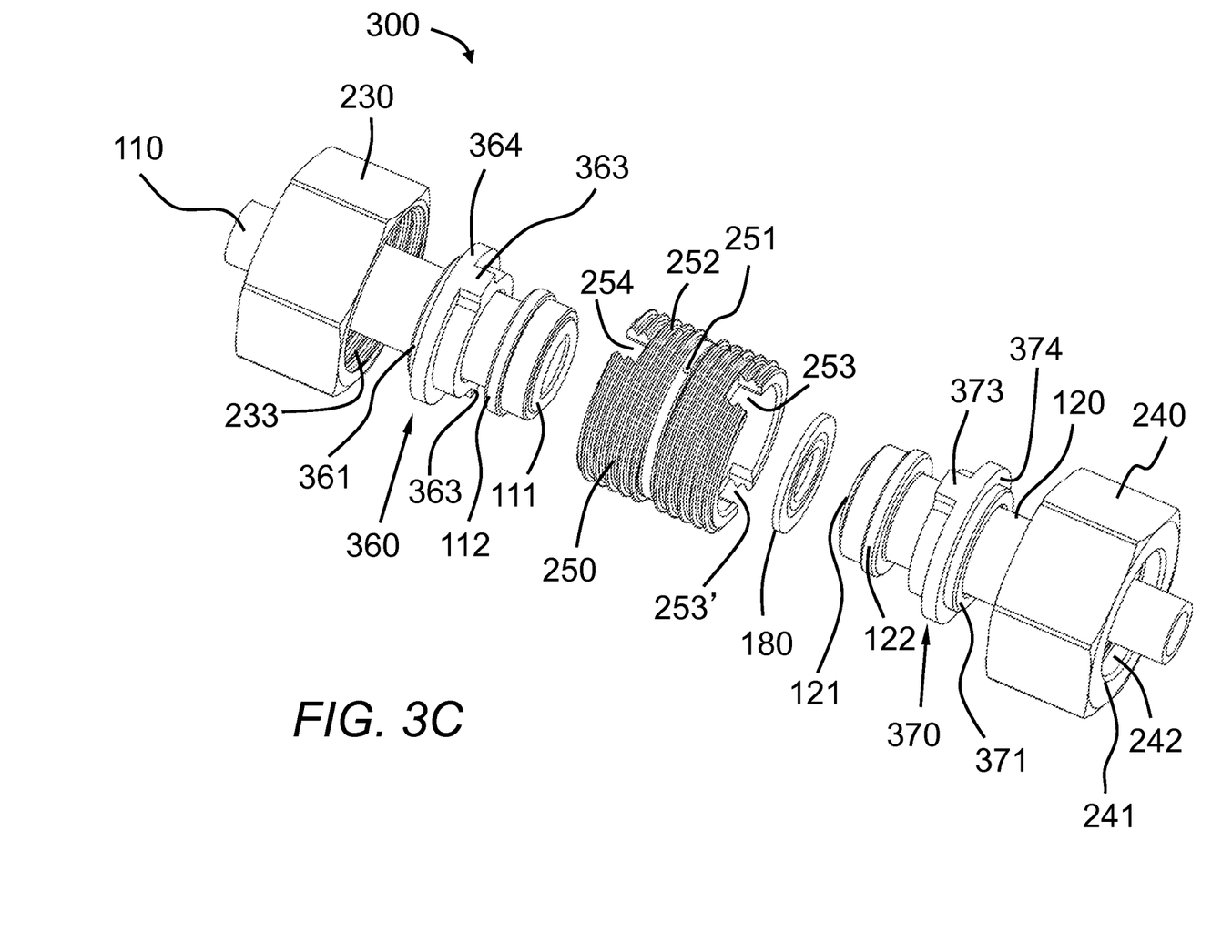
FIG. 3C shows an exploded perspective view of the FIG. 3A fitting assembly.

A fitting assembly 300 in accordance with a second illustrative embodiment of the invention is depicted in FIGS. 3A-3C, where FIG. 3A shows a sectional view; FIG. 3B shows a perspective view; and FIG. 3C shows an exploded perspective view. In FIGS. 3A-3C (and in the remainder of the figures), elements identical to those shown in FIGS. 2A-2C are identified with like reference numerals. In contrast to fitting assembly 200, in assembly 300, coupling nuts 230, 240 and pairing rings 360, 370 (with each of the pairing rings 360, 370 now consisting of only a single respective element) are permanently attached to the fittings once glands 110, 120, respectively, are welded to their respective components or fluid delivery lines. The seal is created between glands 110, 120 and gasket 180, all of legacy design. Nut 230 fits over pairing ring 360, allowing rib 361 to be contained inside opening 232. Similarly, rib 371 of pairing ring 370 is contained inside opening 242. Fitting assembly 300 is not field-attachable but is, nevertheless, genderless and fully compatible with field-attachable fitting assembly 200. Fitting assembly 300 is suitable for applications when components and/or gas lines are not expected to be replaced during maintenance, repair or upgrade. In another application, pairing ring 360 is suitable for fastening a blind gland to create a plug.

Nipple 250 is assembled over one of the glands 110, 120. Teeth 363, 363' of pairing ring 360 fit and axially engage into notches 254, 254' (where tooth 363' is opposite tooth 363 but is not visible; and where notch 254' is opposite notch 254 but is not visible). Likewise, teeth 373, 373' of pairing ring 370 fit and axially engage into notches 253, 253' (where tooth 373' is opposite tooth 373 but is not visible). Fastening is accomplished when nuts 230, 240 are tightened over nipple 250. In so tightening, nut 230 applies force to flange 364. This force is axially transferred to flange 112. Likewise, nut 240 applies force to flange 374, which is axially transferred to flange 122. Axial engagement of teeth 363, 363' with notches 254, 254', as well as axial engagement of teeth 373, 373' with notches 253, 253', prevent the transfer of any rotation from nuts 230, 240 to glands 110, 120. Accordingly, torque free fastening is again readily accomplished.

Figure 4A:
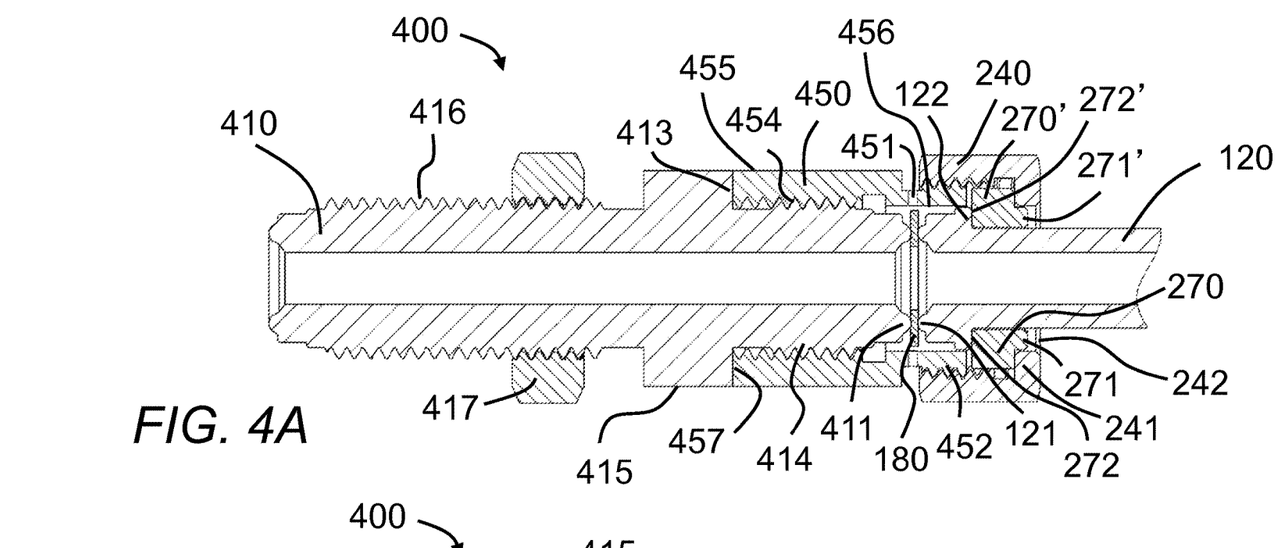
FIG. 4A shows a sectional view of a fitting assembly in accordance with a third illustrative embodiment of the invention.
Figure 4B:
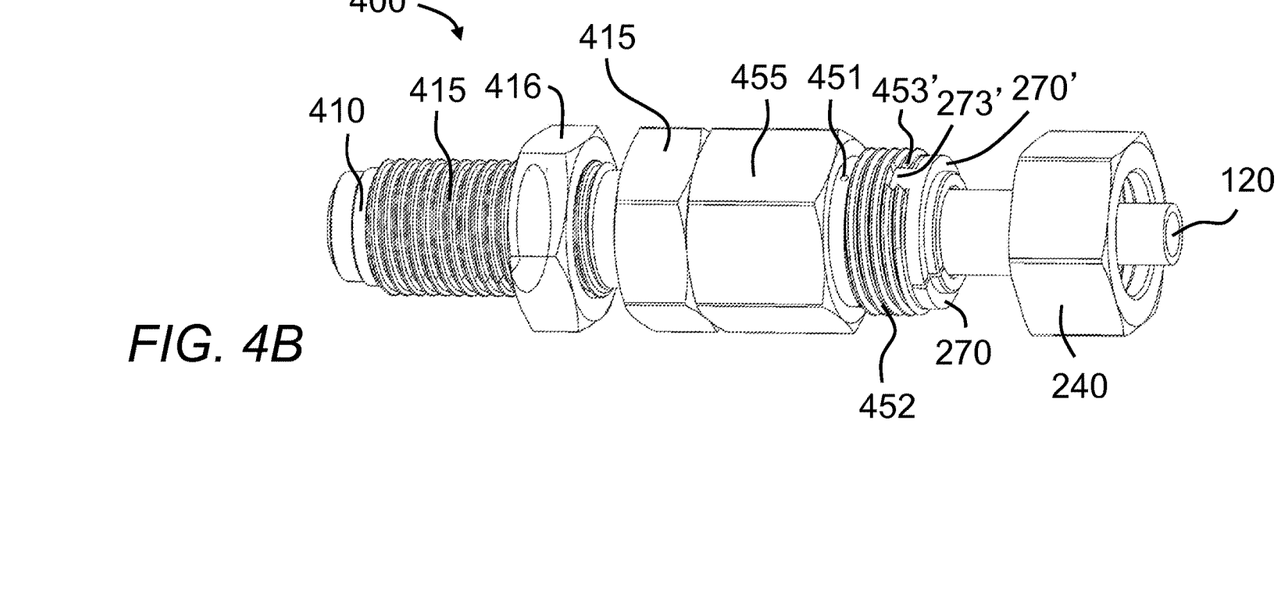
FIG. 4B shows a perspective view of the FIG. 4A fitting assembly.
Figure 4C:
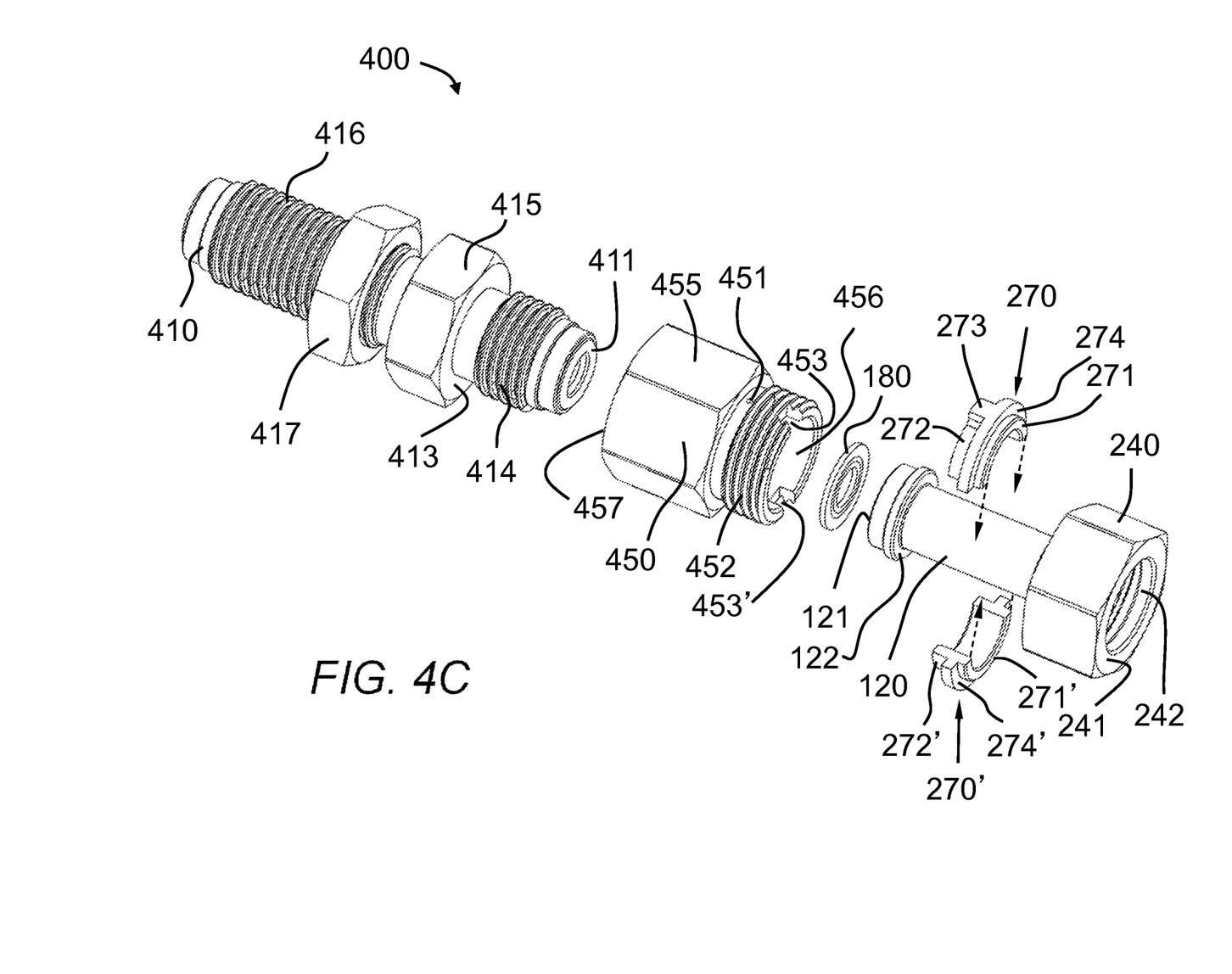
FIG. 4C shows an exploded perspective view of the FIG. 4A fitting assembly.

A fitting assembly 400 in accordance with a third embodiment of the invention is depicted in FIGS. 4A-4C, where FIG. 4A shows a sectional view; FIG. 4B shows a perspective view; and FIG. 4C shows an exploded perspective view. In fitting assembly 400, a seal is created between solid male-nut-and-gland combination (hereinafter "bulkhead") 410, gland 120 and gasket 180, all of legacy design. Bulkhead 410 is fixated to the remainder of the fitting assembly 400 via adapter 450. While a solid-male-nut-and-gland combination is shown, in other embodiments of the invention, adapter 450 may fixate gland 120 to other bodies such as, but not limited to, double-male unions, union elbows, union tees, union crosses, components with integral male body fittings and a variety of union adapters. Alternatively, adapter 450 is suitable to adapt fittings in accordance with the invention to legacy glands and male nut combinations.

Coupling nut 240 is assembled over gland 120 by sliding over flange 122. The opening 242 at shoulder 241 is larger than flange 122. Therefore, nut 240 can be assembled over a previously welded gland 120. Likewise, adapter 450 is assembled over gland 120 by sliding over flange 122. The opening 456 and thread 454 of adapter 450 are larger than the diameter of glands 120. After placing nut 240, adapter 450 is tightened over the male thread of bulkhead 410. Adapter 450 includes leak testing holes 451, 451' (where testing hole 451' is opposite testing hole 451 but is not visible), internal adapting thread 454, male thread 452, and two notches 453, 453' on the edge of thread 452. In addition, adapter 450 includes hex nut 455 for the purpose of tightening adapter 450 over male thread 414 of bulkhead 410. When assembled, adapter 450 is tightened to reach contact between end surface 457 and step 413 of bulkhead 410. Bulkhead 410 also includes bead 411, hex 415, thread 416 and nut 417, as known in the art.

Pairing ring counterparts 270, 270' are placed over gland 120, as depicted in the figures. Pairing ring counterparts 270, 270' may be two identical parts. Pairing ring counterpart 270 includes ribs 271, 272, tooth 273 and flange 274. Similarly, pairing ring counterpart 270' includes ribs 271', 272', tooth 273' and flange 274'. Nut 240 fits over assembled pairing ring 270+270' with combined ribs 271+271' contained inside opening 242. Teeth 273, 273' of pairing ring 270+270' fit and axially engage notches 453, 453'. Fastening is accomplished when nut 240 is tightened over thread 452 of adapter 450. So tightened, nut 240 applies force to flange 274+274'. The force is axially transferred to flange 122. Axial engagement of pairing ring 270+270' via teeth 273, 273' and notches 453, 453' prevents the transfer of any rotation from nut 240 to gland 120. Accordingly, torque free fastening is accomplished. When tightening nut 240, hex 415 serves as an anchor for a second wrench. Likewise, when adapter 450 is used for torque-free fastening over legacy male nut and gland combinations, the male nut hex may be used to anchor the second wrench.

Unlike legacy fittings, hex sizes of nuts 230, 240 and hex 455 of adapter 450 are preferably the same. For example, 7/16 inch, 3/4 inch, 3/4 inch and 1 1/16 inch may be utilized for face sealed fittings of tube sizes 1/8 inch, 1/4 inch, 3/8 inch and 1/2 inch, respectively. These hex sizes match the hex sizes of legacy female nuts. The respective hex sizes of the legacy male nuts are presently 3/8 inch, 5/8 inch, 5/8 inch and 15/16 inch.

Figure 5A:
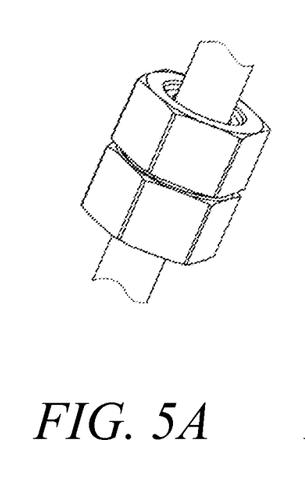
FIG. 5A shows a perspective view of a coupling in accordance with an illustrative embodiment of the invention.
Figure 5B:
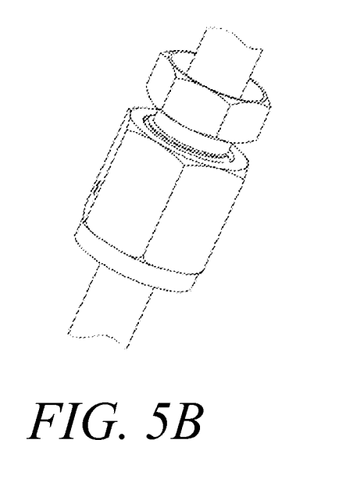
FIG. 5B shows a perspective view of a legacy coupling.
Figures 5C, 5D:
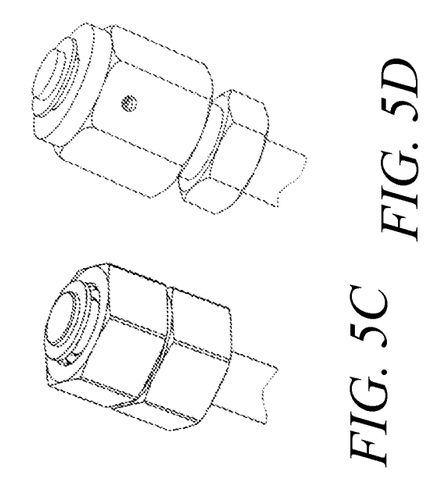
FIG. 5C shows a perspective view of a plug in accordance with an illustrative embodiment of the invention.
FIG. 5D shows a perspective view of a legacy cap.
Figure 5E:
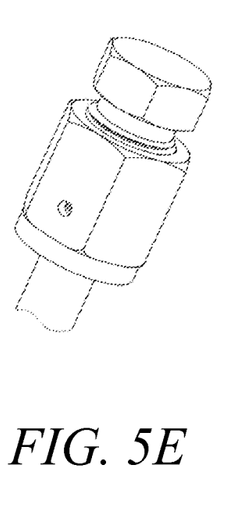
FIG. 5E shows a perspective view of a legacy plug.
Figure 5F:
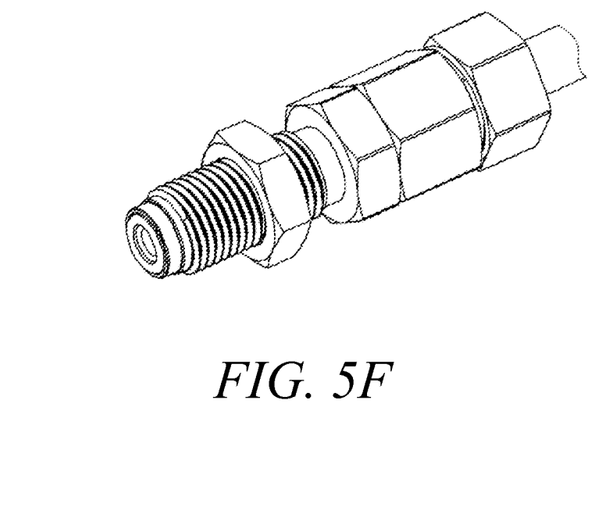
FIG. 5F shows a perspective view of a coupling-to-bulkhead in accordance with an illustrative embodiment of the invention.
Figure 5G:
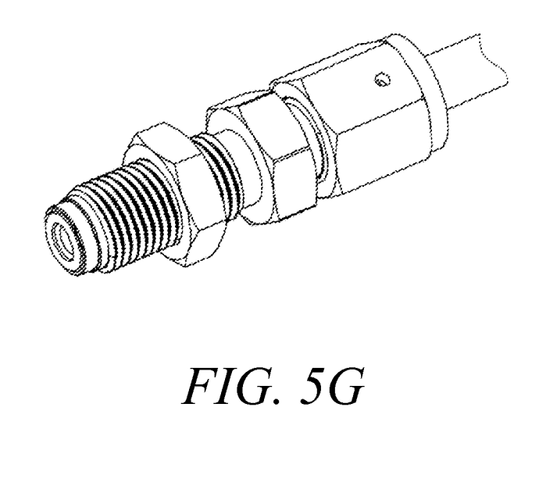
FIG. 5G shows a perspective view of a legacy coupling-to-bulkhead.

The above-described embodiments have footprints that are smaller than, or comparable to legacy fittings. A comparison is made in FIGS. 5A-5G, where: FIG. 5A shows a perspective view of a coupling in accordance with an illustrative embodiment of the invention; FIG. 5B shows a perspective view of a legacy coupling; FIG. 5C shows a perspective view of a plug in accordance with an illustrative embodiment of the invention; FIG. 5D shows a perspective view of a legacy cap; FIG. 5E shows a perspective view of a legacy plug; FIG. 5F shows a perspective view of a coupling-to-bulkhead in accordance with an illustrative embodiment of the invention; FIG. 5G shows a perspective view of a legacy coupling-to-bulkhead. These figures are approximately drawn to scale. It will be noted that the coupling embodiment in FIG. 5A is shorter than the legacy coupling in FIG. 5B. Likewise, the plug embodiment in FIG. 5C is shorter than the legacy cap and plug in FIGS. 5D and 5E, respectively. Finally, the coupling-to-bulkhead embodiment in FIG. 5F is about equal in length to the legacy coupling-to-bulkhead in FIG. 5G.

The above-described embodiments, and, more generally, embodiments falling within the scope of the invention, thereby provide cost- and size-competitive, Attachable, Removable Torque-less (ARTless) fittings that, for the first time, are both torque-free and field-attachable/removable. By virtue of being field-attachable/removable, and for the benefits of torque-less manifolds, ARTless fittings may be used along with components and fluid delivery lines with glands only (i.e. without permanently attached legacy fittings). These gland-only components and fluid delivery lines, when used with legacy SN fittings, are fully compatible with legacy installations. Alternatively, when coupled with ARTless fittings, such gland-only components and fluid delivery lines facilitate a straightforward transition into torque free fittings with few or any presently known downsides.

Instead of just using legacy SN fittings, legacy fittings may be upgraded to apply ARTless fittings when, for example, components or lines are replaced during maintenance or repair, or preemptively to prevent loosening in areas with a lot of vibration. In many cases, legacy nuts may simply be pushed back to clear the gland area for installation of ARTless fittings. Otherwise, tight space fittings with male nuts may be upgraded to use ARTless fittings via adapters like adapter 450 set forth above. Lastly, tight space fittings with female nuts may be upgraded by cutting the female nut off.

In summary, aspects of the invention provide at least four unique key features:
1. fittings that are symmetrical/genderless;
2. fittings that are field-attachable/removable over previously welded glands;
3. fittings that are torque free; and
4. fittings that have footprints comparable or smaller than legacy assemblies.

In closing, it should again be emphasized that the above-described embodiments of the invention are intended to be illustrative only. Other embodiments can use different types and arrangements of elements, as well as different method steps, for implementing the described functionality. These numerous alternative embodiments within the scope of the invention will be apparent to one skilled in the art.

Figure 6:
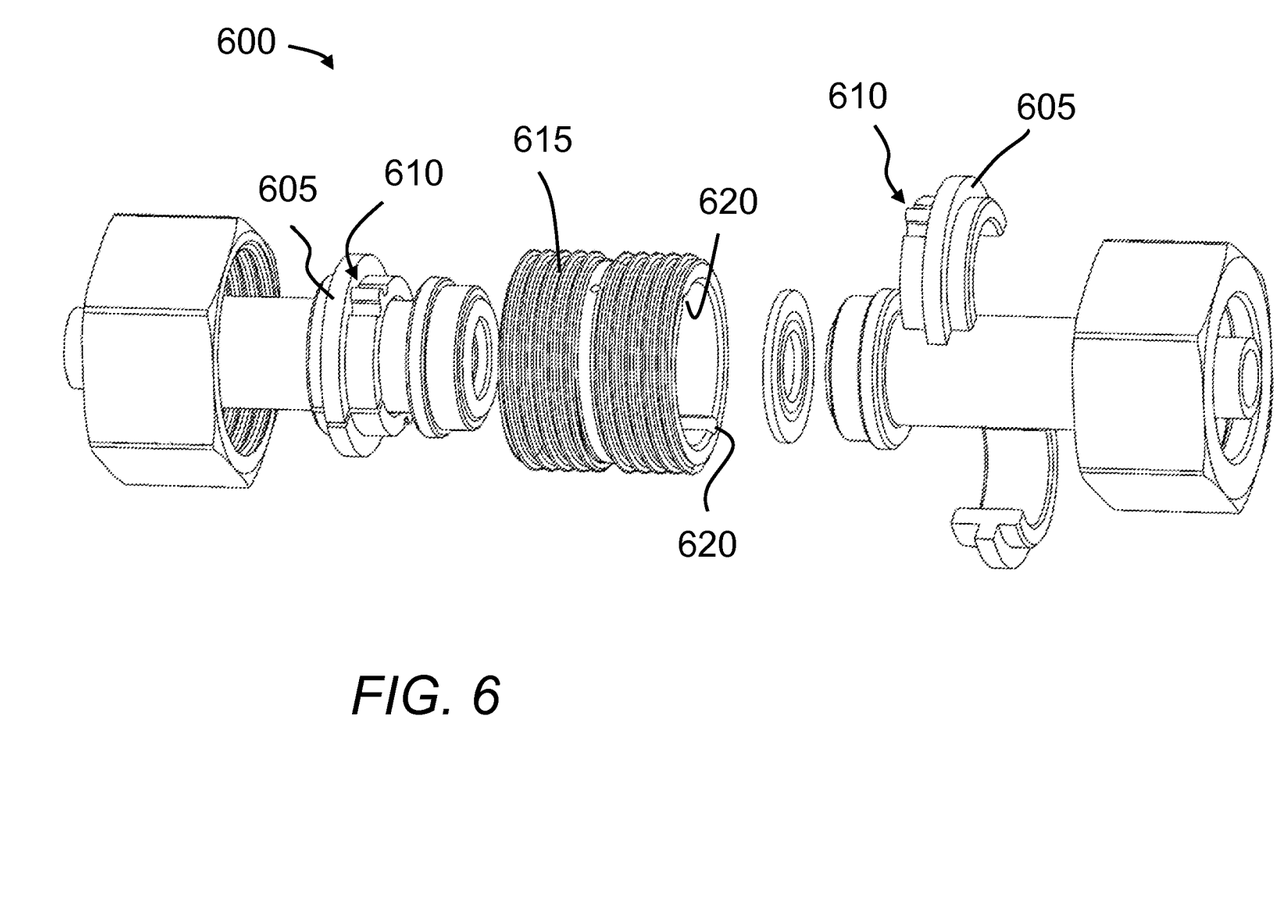
FIG. 6 shows an exploded perspective view of a fitting assembly in accordance with a fourth illustrative embodiment of the invention.

As just one example, while the above-described embodiments describe pairing rings having teeth (i.e., projections) that axially engage notches (i.e., slots) in nipples in order to inhibit relative rotation between the pairing rings and nipples, one having ordinary skill in the art will recognize that a multiplicity of alternative designs for these engagement features may be utilized. These alternative designs will also fall within the scope of the invention. FIG. 6, as just one example, shows an exploded perspective view of an alternative fitting assembly 600 similar to fitting assembly 200, but where pairing rings 605 define four pairing ring engagement features 610 in the form of shallow, curved peaks and valleys. Nipple 615, in turn, defines four complementary nipple engagement features 620 in the form of shaped grooves. When pairing ring engagement features 610 and nipple engagement features 620 axially engage one another, relative rotation between the pairing rings 605 and the nipple 615 is constrained, allowing torque free tightening. Additional alternative embodiments falling within the scope of the invention may have the nipples define the projections and the pairing rings define the complementary slots.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. An assembly comprising:
a first tube;
a first flange, the first flange disposed at a terminus of the first tube, defining a first outwardly projecting flange shoulder, and characterized by a first maximum external flange diameter;
a first pairing ring, the first pairing ring defining a proximal rib, a distal rib, and a first pairing ring engagement feature;
a nipple, the nipple defining a first nipple engagement feature and first external nipple threads, and characterized by a minimum internal nipple diameter greater than the first maximum external flange diameter;
a first nut, the first nut defining first internal nut threads and a first inwardly projecting nut shoulder, the first inwardly projecting nut shoulder defining a first hole having a diameter greater than the first maximum external flange diameter; and
a gasket;
wherein:
the first pairing ring surrounds a portion of the first tube adjacent to the first flange;
the first pairing ring abuts the first outwardly projecting flange shoulder;
the first pairing ring abuts the first inwardly projecting nut shoulder;
the nipple at least partially surrounds the first outwardly projecting flange shoulder;
the nipple at least partially surrounds the first pairing ring;
the entire nipple is in spaced relation to the first tube, and the proximal rib occupies a space between the first tube and the nipple;
the first nut at least partially surrounds the first pairing ring;
the entire first nut is in spaced relation to the first tube, and the distal rib occupies a space between the first tube and the first inwardly projecting nut shoulder;
at least a portion of the first internal nut threads engage at least a portion of the first external nipple threads;
the first nipple engagement feature interlocks with the first pairing ring engagement feature so as to inhibit relative rotation between the nipple and the first pairing ring;
the gasket forms a gastight seal with the first flange; and
the first pairing ring, the nipple, the first tube, and the first flange are not permanently altered by forming the gastight seal in the assembly.

2. The assembly of claim 1, further comprising:
a second tube;
a second flange, the second flange disposed at a terminus of the second tube;
a second nut, the second nut defining second internal nut threads;
wherein the nipple further defines second external nipple threads, and
at least a portion of the second internal nut threads engage at least a portion of the second external nipple threads.

3. The assembly of claim 2, wherein the first flange and the second flange are urged towards one another as the first internal nut threads threadably engage the first external nipple threads and the second internal nut threads threadably engage the second external nipple threads.

4. The assembly of claim 2, wherein the gasket is disposed between the first flange and the second flange.

5. The assembly of claim 1, wherein the first pairing ring comprises:
a first pairing ring portion; and
a second pairing ring portion, the second pairing ring portion being manually separable from the first pairing ring portion.

6. The assembly of claim 1, wherein;
the first pairing ring engagement feature comprises a projection; and
the first nipple engagement feature comprises a slot dimensioned to receive the projection.

7. The assembly of claim 1, wherein;
the first nipple engagement feature comprises a projection; and
the first pairing ring engagement feature comprises a slot dimensioned to receive the projection.

8. The assembly of claim 1, wherein:
the first pairing ring further defines a second pairing ring engagement feature; and
the nipple further defines a second nipple engagement feature;

wherein the second pairing ring engagement feature interlocks with the second nipple engagement feature so as to further inhibit relative rotation between the nipple and the first pairing ring.

9. The assembly of claim 1, wherein the nipple further defines an adapter nut, the adapter nut defining internal adapter nut threads therein.

10. A method for mating tubing, the method comprising the steps of
receiving a first tube;
receiving a first flange, the first flange disposed at a terminus of the first tube, defining a first outwardly projecting flange shoulder, and characterized by a first maximum external flange diameter;
receiving a first pairing ring, the first pairing ring defining a proximal rib, a distal rib, and a first pairing ring engagement feature;
receiving a nipple, the nipple defining a first nipple engagement feature and first external nipple threads, and characterized by a minimum internal nipple diameter greater than the first maximum external flange diameter;
receiving a first nut, the first nut defining first internal nut threads and a first inwardly projecting nut shoulder, the first inwardly projecting nut shoulder defining a first hole having a diameter greater than the first maximum external flange diameter;
receiving a gasket; and
assembling such that, simultaneously:
the first pairing ring surrounds a portion of the first tube adjacent to the first flange;
the first pairing ring abuts the first outwardly projecting flange shoulder;
the first pairing ring abuts the first inwardly projecting nut shoulder;
the nipple at least partially surrounds the first outwardly projecting flange shoulder;
the nipple at least partially surrounds the first pairing ring;
the entire nipple is in spaced relation to the first tube, and the proximal rib occupies a space between the first tube and the nipple;
the first nut at least partially surrounds the first pairing ring;
the entire first nut is in spaced relation to the first tube, and the distal rib occupies a space between the first tube and the first inwardly projecting nut shoulder;
at least a portion of the first internal nut threads engage at least a portion of the first external nipple threads;
the first nipple engagement feature interlocks with the first pairing ring engagement feature so as to inhibit relative rotation between the nipple and the first pairing ring;
the gasket forms a gastight seal with the first flange; and
the first pairing ring, the nipple, the first tube, and the first flange are not permanently altered by forming the gastight seal during the step of assembling.

11. The method of claim 10, further comprising the steps of:
receiving a second tube;
receiving a second flange, the second flange disposed at a terminus of the second tube wherein the nipple further defines second external nipple threads;
receiving a second nut, the second nut defining second internal nut threads;
assembling such that
at least a portion of the second internal nut threads engage at least a portion of the second external nipple threads.

* * * * *